United States Patent Office 3,536,690
Patented Oct. 27, 1970

3,536,690
PROCESS AND PRODUCT
Thomas Baldwin Talcott, Wadsworth, Ohio, assignor to The Firestone Tire & Rubber Company, Akron, Ohio, a corporation of Ohio
No Drawing. Filed June 24, 1968, Ser. No. 739,161
Int. Cl. C08d 3/08, 3/12; C08f 3/18
U.S. Cl. 260—94.2                5 Claims

ABSTRACT OF THE DISCLOSURE

Novel crystalline polymers are produced from conjugated diene monomers by using sodium-based catalysts. The polymers produced are highly crystalline and are higher melting and less soluble than conventional amorphous, rubbery diene polymers. Crystalline 3,4-polyisoprene is disclosed as a new composition of matter.

BACKGROUND OF THE INVENTION

This invention relates to new crystalline polymers of conjugated dienes, and the process for making them. Particularly, crystalline polymers produced from 1,3-butadiene and from 2-methyl-1,3-butadiene (isoprene) are prepared by initiating polymerization with a sodium-based catalyst, and separating the desired crystalline polymer from other, amorphous reaction products.

The use of sodium-based catalysts in the polymerization of conjugated dienes has been known for some time. Sodium-catalyzed reactions have, however, been difficult to control, and much more success has been obtained in using lithium-based initiators for the polymerization of conjugated dienes into rubbery polymers suitable for partial or total replacement of natural rubber or the well-known emulsion polymers, such as SBR or BR. Sodium has also been reacted with alcohols and olefins to produce the so-called "alfin" catalysts, which are also well known as initiators for the polymerization of conjugated dienes.

With the introduction of so-called "stereospecific" polymerization, greater knowledge of the physical and chemical nature of the polymers so made has evolved. Improved analytical techniques have revealed the structure and configuration of diene polymers to a degree which was unknown before.

Giulio Natta, in his Nobel Prize Address of Dec. 12, 1963 (reprinted in vol. 38, No. 1 of Rubber Chemistry And Technology, March 1965) has summed up past work together with his own developments in the understanding of the structure of synthetic macromolecular substances. Natta has introduced the terms isotactic, and syndiotactic, among others, to describe the crystalline structures determined to exist in many different types of vinyl polymers previously thought to be amorphous.

When the production of a polymer containing side vinyl groups results in a random distribution along the chain of two or more of these structural variations, no crystallinity is observed and the polymer is amorphous. But when the method of polymerization produces a regular succession of monomeric units in one particular steric configuration, crystalline properties are realized. Thus while a completely amorphous vinyl polymer might contain substantial portions of the several structural variations (revealed by infra-red analysis) these geometric units would be randomly distributed along the polymer chains, and hence no crystalline behavior would result.

In the case of polymers of 1,3-butadiene, monomeric units are attached in two basic ways: in the 1,2 configuration, with pendant vinyl groups, and in the 1,4 configuration. The latter type contains a double bond in each monomeric group which may be either cis- or trans-. The 1,2 polymer which has all the pendant vinyl groups on the same side of the chain is given the name isotactic, and the 1,2 polymer having the pendant vinyl group alternatingly on opposite sides along the chain is called syndiotactic.

Physical properties of the four stereoregular polymers of 1,3 butadiene have been determined by Natta as shown in the following Table I:

TABLE I

| Structure | Melting point, °C. | Identity period (A.) |
|---|---|---|
| Trans-1,4 | 146 | *4.85, 4.65 |
| Cis-1,4 | 2 | 8.6 |
| Isotactic 1,2 | 126 | 6.5 |
| Syndiotactic 1,2 | 156 | 5.14 |

*Two crystalline modifications of trans-1,4-polybutadiene exist, the former being stable below about 76° C., the latter stable above this temperature.

A sample of atactic 1,2 polybutadiene was also examined and found to be completely amorphous, with a softening point below room temperature.

In the same manner, isoprene polymers are found with monomer units connected in the 1,4 position (both cis- and trans-) and in the 3,4 position, as well as the 1,2 position. Cis-1,4-polyisoprene is found in nature as natural rubber, and trans-1,4-polyisoprene occurs naturally as gutta percha and balata. Both cis- and trans-isomers of 1,4-polyisoprene have been synthesized by stereospecific polymerization.

Table II, below, contains data on physical properties of known stereoregular polyisoprenes showing crystallinity:

TABLE II

| Structure | Melting point, °C. | Identity period (A.) |
|---|---|---|
| Cis-1,4 | 28, 14, 36 | 8.10, 25.12 |
| Trans-1,4 | 65, 74, 68 | 4.72, 7.85 |

A sample of atactic 3,4-polyisoprene was also examined and found to be completely amorphous, softening in the range of 50°–57° C.

SUMMARY OF THE INVENTION

It is an object of this invention to present an improved method for producing crystalline polymers from conjugated diene monomers.

It is another object of this invention to present, as a new product, highly-crystalline isotactic 3,4-polyisoprene.

Investigation has revealed that metallic sodium, in the presence of certain organic substances, acts as an efficient stereospecific catalyst whereby highly crystalline polymers may be readily prepared from conjugated diene monomers.

Metallic sodium has been used here in the past as an agent for purifying 1,3-butadiene. A dispersion of metallic sodium in vaseline was added, along with fluorene, to the 1,3-butadiene, and the mixture was agitated overnight at room temperature. Simple distillation of the product material produced a monomer which was free of acetylenes.

Surprisingly, it was noticed that bottles containing the sodium and fluorene mixture in the 1,3-butadiene monomer formed, on standing at room temperature, a quantity of polymer which proved to be crystalline-1,2-isotactic polybutadiene.

Subsequent experiments were performed using commercial 1,3-butadiene monomer from various sources, and containing various impurities. From this work, it was postulated that the presence of certain materials considered to be contaminants in the impure 1,3-butadiene would enhance the production of crystalline polymer, while other "contaminants" acted so as to allow practically no polymer formation or no crystalline polymer formation. It is surmised that the metallic sodium in the presence of monomer reacts to produce organosodium compounds which, in turn, determine the character of the polymerization reactions. This may well be due to metalation of the impurity by the propagating polymer chain: ~C=Na. For example, it was found that a small quantity of 1,2-butadiene acted to prevent the formation of crystalline polymer, while the presence of fluorene (not present as an impurity in commercial 1,3-butadiene) had the opposite effect, discouraging the formation of amorphous polymer and enhancing the yield of crystalline polymer. (The use of fluorene, among other poly cyclic aromatic hydrocarbons, had been suggested as a modifier to produce polymers having a lower molecular weight; never as a means of improving yield of a particular structural configuration.)

Since the primary source of 1,3-butadiene used had been of a type which contained 1,2-butadiene as a trace contaminant, this very fact had previously prevented the initiation of the polymerization reaction of the invention. It was only on changing to another source of monomer that the surprising stereospecific nature of the sodium-based catalysts was discovered.

Similarly, sodium-based catalysts were used to produce highly crystalline isotactic 3,4-polyisoprene. This polymer was found to have a birefringent melting point of from 160° to 170° C., and an identity period of 6.36 A. As in the case with 1,3-butadiene, small amounts of certain organic compounds had a great effect on the product formed, certain ones being favorable for the formation of a crystalline product.

The crystalline polymers of the invention are characterized by having melting-points which are considerably higher than the elastomeric materials commonly encountered (for example, natural rubber or cis-1,4-polybutadiene) and they are thus not "rubbery" at room temperature. The crystalline polymers are also less soluble in the usual rubber solvents than the commoner polymers prepared from conjugated diene monomers, and these properties make the polymers of the invention useful in many applications. For example, on stretching at elevated temperatures, the polymers will orient to form strong monofilaments. Films may be pressed from the powdered polymer, also. These properties lend themselves to the use of the products in the fields of plastics and fibers or textiles. Conventional molding and extruding methods may be used with the polymers to form molded articles. They may also be plasticized with known oils or plasticizers, or cross-linked with sulfur.

DESCRIPTION OF THE PREFERRED EMBODIMENTS

The preferred monomers of the invention are 1,3-butadiene and isoprene. Both these materials are commercially available in quantity, and many polymers with useful qualities have been produced from them. Other conjugated diene monomers can be employed, such as piperylene, 2,3-diamethyl butadiene, 2-methyl-1,3-pentadiene, 2,3-dimethyl-1,3-pentadiene, 2-phenyl-1,3-butadiene, 4,5-diethyl-1,3 octadiene, 1,3-cyclohexadiene, and the like. Various commercial sources produce conjugated diene monomers having trace impurities which can have a considerable effect on the polymerization reaction and the polymer structures produced. Many of the organic compounds listed below as having a catalytic effect when combined with metallic sodium are present in these commercial monomers. Hence the analysis of the monomer is of great importance in determining the type and amount of catalyst employed.

The catalyst system which is preferred is termed "sodium-based." By this term is meant both sodium metal and any of a number of organosodium compounds and sodium adducts. Where metallic sodium is employed, in many cases, the sodium catalyst reacts with impurities present, and produces an organosodium compound which in turn acts as the catalyst. In the absence of the needed amounts of certain impurities, the disodium adduct of the monomer is formed. This starts chain propagation. This may be all that is needed for the formation of crystalline polybutadiene of high melting point (i.e. in the presence of fluorene). If it is desired to employ an organosodium catalyst, this compound can be added as is, or may be formed in situ, by charging the sodium and the organic reactant separately to the polymerization vessel.

It has been found that the metallic sodium catalyst, either used alone or in combination with an organic compound as above, should be in a form having a small particle size. Initial work with a laboratory-prepared paste of sodium in vaseline gave only moderate success; later work with a paste which had been given sonic treatment to reduce its particle size was more effective. Finally, a commercially available sodium dispersion having a particle diameter of 0.5 to 5.0 microns proved the most effective, in terms of crystalline polymer yield.

While some production of the polymers of the invention was obtained using metallic sodium alone, improved yields of crystalline polymer have been obtained with the presence of certain organic materials, along with sodium. These organic materials can be added to the polymerization vessel, or may occur naturally as impurities in the monomer. Some of the organic materials found to be useful for this purpose are, for example: fluorene, pentene-2, especially the trans isomer, among others.

Organosodium compounds used as such for the catalyst of the invention include, for example: phenylsodium, butylsodium, allylsodium, 9-fluoroenylsodium (with small amount of free sodium metal or sodium compounds in this list), among others.

Sodium adducts of organic compounds may also be employed as part or all of the sodium-based catalyst system. An example of this class of materials is the disodium adduct of anthracene. Combinations of the above materials may also be employed as catalysts.

The preferred polymerization temperature is from about 0° C. to 150° C. Temperatures in the high portions of this range naturally produce faster reaction rates. However, satisfactory results have been obtained with polymerization temperatures of about 30° C. in the case of bulk reactions, and about 50° C. in the presence of a hydrocarbon diluent. An isoprene polymerization run was made at 5° C.

The use of a diluent is optional, and good results have been obtained using bulk polymerization techniques. However, a diluent may be employed for better control of the reaction. Diluents which may be used in the correct amounts are those which are inert to the catalyst, for example: cyclohexane, methyl cyclopentane, and the lower paraffin hydrocarbons and lower aliphatic mono-olefins, such as butanes, pentanes, hexanes, hentanes, octanes, and decanes. The diluent can be mixtures of these hydrocarbons or of their various isomers. It may be a solvent for the monomer only, or for both the monomer and the product, or it may be a non-solvent in which one or more of the components is dispersed without dissolving.

The amounts of sodium-based catalyst used in the process of the invention may be expressed in terms of sodium content. From about 0.10 part by weight to about 1 part by weight of sodium per 100 parts of monomer is preferred. If the sodium is to be reacted with an organic compound in situ it is preferred to employ about an equivalent amount of the organic compound so that essentially all of the sodium will then be present as an organosodium compound. This will vary with the activity of additives toward sodium or carbon-bound sodium and monomer purity.

Fluorene, in addition to being used with sodium as an organic component of the organosodium catalyst complex, also functions as a polymerization aid in that it increases yields of crystalline polymer and discourages the formation of non-crystalline polymer.

Since the catayst is destroyed by moisture and oxygen, it is important in order to conserve catalyst to exclude these materials from the polymerization zone. (The desired product can, however, be obtained in the presence of some moisture—also in the presence of certain ketones in small amounts.) An inert gas, such as nitrogen, may be used, or, as in the case of laboratory "bottle" polymerization runs, an excess amount of the volatile monomer may be added, and allowed to boil off, purging the atmosphere in the reaction vessel.

The reaction vessel should be agitated for temperature control, catalyst and heat distribution and convenience in removing the product, and pressure-sealed to prevent the loss of volatile monomer. Some method of temperature control should be provided, as the reaction is exothermic.

The polymerization reaction may be continued to 100% completion, or it may be stopped at partial conversion and the unreacted monomer recovered. In order to stop the reaction, the sodium-based catalyst can be neutralized by the addition of a material with an active hydrogen atom, such as methanol. In practice it is convenient to discharge the polymerization products directly into a hydrocarbon solution containing a little methanol or to inject the antioxidant in methanol or methanol/hydrocarbon solution, thereby incorporating an antioxidant at the same time the catalyst is de-activated. If desired, the antioxidant may be incorporated at a later stage, or left out entirely, although an antioxidant is required in most polymer applications.

In the practice of the invention there is formed, in addition to the desired crystalline polymers, a certain amount of polymer having a differing structure. Separation of the desired product from these different materials is thus necessary. One effective method of separation utilizes the difference in solubility of the reaction products in hydrocarbon solvents. Since both crystalline isotactic 3,4-polyisoprene and crystalline isotactic 1,2-polybutadiene are insoluble in hexane at room temperature, separation of these materials, for example, may be accomplished by washing the polymerized material in room-temperature hexane, and removing the more soluble polymer portion and leaving relatively pure crystalline product. "Room temperature" can be defined as from about 15° C. to about 30° C.

Various analytic techniques are employed to identify the crystalline polymers of the invention. Infrared film analysis reveals the nature of the chemical bonding and gives a quantitative measure of the various steric structures present. In the case of polybutadiene, a crystallinity band at 14.4 mircons may be found on the spectrum of the film showing isotactic 1,2-crystallinity.

Identification of the polymers of the invention was also performed by means of a polarizing microscope, which allowed samples to be heated. The temperature at which birefringence disappeared was taken as the melting point of the polymer.

Techniques of X-ray diffractometry have been especially effective in evaluating the relative crystallinity of polymers. These techniques were used in determining the degree of crystallinity present in the various fractions separated from the mixed polymers produced. Measurements of the amount and type of crystallinity present were made, correlating with the birefringent melting points obtained as above.

The relative crystallinities of the polybutadiene samples were determined on X-ray diffractometer tracings with 100% trans polybutadiene as a standard. All X-ray studies were done at room temperature.

A better understanding of the invention may be obtained by reference to the following examples, which are illustrative, but not intended to limit the scope of the invention. All polymerizations were conducted in beverage bottles, with caps lined with Viton A or Buna N rubber. In many cases the bottles were dried by baking and flushed with nitrogen before charging. Unless otherwise indicated, all percentages are calculated by weight.

EXAMPLE I

Without purification, drying, or antioxidant removal, 375 grams of butadiene were added to 0.7 gram (0.03 mole) of metallic sodium suspended in hydrocarbon, and 5.4 grams (0.033 mole) of fluorene, and agitated in a closed container for 15 hours at 30° C. After standing without agitation, a residue of coarse yellow particles settled out. After the container sat for a few days, more polymer formed. The monomer was removed from the mix, the polymer soaked in room-temperature toluene and the residue washed with toluene. The toluene soluble fraction (A) was coagulated with acetone and methanol and dissolved in room-temperature toluene for a repurification. The final acetone coagulum was methanol washed and submitted to the infrared laboratory for analysis. This fraction when dried was rubbery. It was predominantly 1,2 structure and showed no crystallinity band at 14.4 microns.

The fraction (B) which was insoluble in toluene at room temperature was found to be very high in 1,2 structure, showed isotactic 1,2 crystallinity bands and gave an X-ray diagram characteristic of 1,2 isotactic crystallinity. Fraction B was then further extracted, this time in boiling toluene. From this extraction, portions C (insoluble), and D (polymer which precipitated as the boiling toluene filtrate was coled to 0° C.) were recovered.

Portion C appeared to be the most crystalline of all the fractions, and was a hard, fibrous non-rubber. Portion D was not as hard and fibrous as portion C, but neither was it as rubbery as portion A, which was soluble in toluene at room temperature.

EXAMPLE II

Fluorene, purified 1,3-butadiene, and a commercial dispersion of sodium in mineral spirits diluted with mineral oil were charged to the polymerization bottle in the above order. Proportions of these materials were such as to give the following ratios:

1,3-butadiene—100 g.
Sodium, millimoles—16.0
Fluorene, millimoles—9.6

The polymerization bottle was agitated at 30° C. for 41 hours, at which time the unreacted monomer was flashed off, leaving a polymer yield of 30 grams per 100 grams of monomer charged. The catalyst was deactivated with methanol, and a trace of antioxidant was added. After repeated washing with hexane at room temperature, an amount of hexane-insoluble polymer remained equivalent to 7.5 grams per 100 grams of monomer charged.

Examination of X-ray diffraction patterns obtained from the hexane-insoluble portion indicated a very strong isotactic 1,2 structure and some trans-1,4 structure.

EXAMPLE III

Polymers from three polymerization runs similar to the above examples were combined and examined. Very strong X-ray patterns for isotactic 1,2-polybutadiene were obtained on these. The melting point of the combined mass was about 130° C.

EXAMPLE IV

A trial similar to Example I was performed using hexane as a diluent, and charged first into the polymerization bottle. The 1,3-butadiene monomer used above was distilled for this trial. The following proportions were used:

1.3-butadiene [1]—100 g.
Sodium, millimoles—18.9
Fluorene, millimoles—10.9
Hexane—246 g.

---
[1] A pure grade of butadiene containing no 1,2-butadiene monomer.

The bottle was agitated at 30° C. for 40 hours, and was found to contain 69.0 grams of polymer per 100 grams monomer charged. Of this amount, 19.7 grams per 100 grams monomer charged were insoluble in hexane.

X-ray diffraction patterns observed for this insoluble portion indicated a strong isotactic 1,2 structure and some trans-1,4 structure.

EXAMPLE V

For this trial, 1,3-butadiene monomer was obtained from another source. This monomer contained approximately 0.15% 1,2-butadiene contamination after distilling. Additional amounts of sodium and fluorene were used to overcome this contamination. The following proportions were charged:

1,3-butadiene—100 g.
Sodium, millimoles—37.3
Fluorene, millimoles—18.8
Hexane—90 g.

After agitation at 30° C. for 72 hours, all the monomer had polymerized, and 32.0 grams per 100 grams monomer charged were insoluble in hexane.

Diffractometer measurements on the insoluble polymer showed strong isotactic 1,2 crystallinity, and very slight relative trans-1,4 crystallinity.

EXAMPLE VI

For this preparation 1,3-butadiene monomer was used which contained essentially no 1,2-butadiene contamination. The following proportions were charged:

1,3-butadiene—100 g.
Sodium, millimoles—16.0
Fluorene, millimoles—7.0

The reaction proceeded for 22 hours at 30° C., yielding 42.6 grams of polymer per 100 grams monomer charged. After washing with hexane at room temperature, 17.5 grams of insoluble polymer (per 100 grams monomer charged) remained.

X-ray diffraction patterns indicated that a "medium" isotactic 1,2 structure and some trans-1,4 structure were present in the insoluble portion of the polymer. Birefringent melting point for this material was 133° to 140° C. On remelting, the sample had a melting point of 160° C. to 170° C.

An attempt was made to fractionate this sample of polymer by dissolving it in hot (72° C.) CHCl$_3$ and reprecipitating by cooling to −10° C. A polymer scum was formed which was found to show a very strong trans-1,4 crystallinity only, and to have a birefringent melting point of 133°–135° C.

These results show that a crystalline block-copolymer was obtained, which was a combination of isotactic 1,2 structure and trans-1,4 structure.

EXAMPLE VII 136 grams of isoprene [1] and 0.2 gram of sodium metal (added as a mineral oil dispersion) were agitated in a sealed container for about 2½ days at 30° C. At the end of this time they were deactivated with a little methanol added with a large amount of hexane and a small amount of antioxidant. The insoluble polymer was allowed to settle; the liquid polymer in solution was decanted and the residue was washed well with hexane. The residue was found to have a well defined X-ray pattern with orientation at room temperature. No significant amount of polyisoprene structure other than 3,4 addition could be detected by analysis of infrared spectra.

The soluble fraction was about 80% 3,4 structure.

[1] A pure grade of isoprene with very low levels of acetylenes. The 0.1% of cyclopentadiene present was removed by treatment with maleic anhydride and distilling over the isoprene. (0.56 mm. of methyl vinyl ketone present per 100 grams isoprene.)

EXAMPLE VIII

A polymer made in a similar manner with 0.72 mm. of methyl ethyl ketone present per 100 g. isoprene was oriented by melting, drawing out the melt and pulling as it cooled. The melting point as indicated by disappearance of birefringence was found to be 160° C.–180° C. The X-ray pattern indicated isotactic 3,4 polyisoprene crystallinity. Only 3,4 addition could be detected to any significant amount in this polymer by infrared analysis.

EXAMPLE VIIIA

Another sample, made in a similar manner, showed solubility in boiling toluene but merely softening in boiling heptane. This had a crystalline X-ray pattern, similar microstructure by infrared analysis as aforementioned samples and the same lack of solubility in hexane, acetone and methanol with 0.414 millimole of methyl vinyl ketone per 100 grams of isoprene.

EXAMPLE IX

The following materials were agitated in the proportions listed below for 144 hours in a sealed container at 26° C.:

Isoprene [2]—100 grams
Sodium metal [3]—2.75 milligram atoms
Fluorene—1.93 millimoles The product consisted of material insoluble in the isoprene with some liquid polymer dissolved in the isoprene. After the usual procedure of deactivating with methanol in hexane, decanting, hexane, acetone and finally methanol washing; 16 grams of a white powdery polymer was obtained from 218 grams of isoprene which was insoluble in isoprene, hexane, acetone and methanol; soluble in chloroform and in carbon tetrachloride and nearly all soluble in carbon disulfide all at room temperature.

The product was essentially all 3,4 addition infrared analysis. The material gave a sharply defined -ray pattern with an identity period of 6.36 A. for a film oriented by drawing. This identity period indicates an isotactic rather than an syndiotactic 3,4 structure by analogy to isotactic 1,2 polybutadiene and theoretical measurements of the molecular models for crystalline isotactic 3,4 polyisoprene.

The diffractometer tracing indicates a substantial degree of crystallinity.

The melting point as determined by disappearance of birefringence was about 165–175° C. Not all fibers gave exactly the same melting point—probably because of different degrees of orientation. This melting point was determined on drawn monofilament of the CS$_2$ soluble fraction. Melting points on other samples of the original polymer ranged up to 182° C.

EXAMPLE X

To further evaluate the method of the invention in the production of crystalline isotactic 3,4-polyisoprene, a number of polymerization trials were run. The data on these trials and the observations made of the relatively insoluble crystalline polymers produced are shown in Table III below.

Isoprene from two commercial sources was used, source G containing about 2% of trans pentene-2 and source S being relatively free of this material. The crystalline polymer portion in each run was separated from the total polymer product by washing with hexane at room temperature. All the runs were made without a diluent, other than that used to facilitate measurement of catalyst additions. X-ray patterns were judged for their degree of definition of 3,4 crystallinity patterns.

[2] About 2% trans pentene-2 present.
[3] Small particle size sodium dispersion.

Table III shows the effect of trans-pentene-2 in increasing the yield of the desired polymer when metallic sodium is the catalyst, A containing it as an impurity, E having none and F having it as an additive along with a large amount of the cis-pentene-2.

Table III shows also that the sodium compounds phenylsodium and butylsodium are effective catalysts in the presence of fluorene for the formation of crystalline 3,4-polyisoprene.

TABLE III

| Run | A | B | C | D | E | F |
|---|---|---|---|---|---|---|
| Isoprene (G), grams | 100 | 100 | | | | |
| Isoprene (S), grams | | | 100 | 100 | 100 | 100 |
| Fluorene, millimoles | 1.9 | 2.5 | 5.5 | 4.7 | 1.8 | 1.8 |
| Phenylsodium, millimoles | | | 5.5 | 5.3 | | |
| Sodium metal, millimoles | 2.75 | | | | 4.4 | 4.4 |
| Butylsodium, millimoles | | 3.2 | | | | |
| 2-pentenes,[1] grams | | | | | | 8.7 |
| Temperature, ° C | 26 | 5 | 30 | 30 | 30 | 30 |
| Time, hours | 144 | 18 | 120 | 24 | 71 | 71 |
| Crystalline polymer yield, grams | 7.3 | 2.3 | 3.4 | 1.7 | 0.5 | 1.6 |
| X-ray pattern | (2) | (3) | (4) | (5) | | |
| Solubility in hexane at 25° C | 0 | 0 | 0 | 0 | 0 | 0 |

[1] 46% trans-pentene-2, 53.1% cis-pentene-2.
[2] Well-defined.
[3] Weak.
[4] Medium to strong.
[5] Weak to medium.

The crystalline polymers were insoluble in hexane and pentane at room temperature, but soluble in $CS_2$, $CCl_4$, and $CHCl_3$ at room tmperature. The birfringent melting point of the crystalline polymers was found to be about 155° C. to 180° C.

EXAMPLE XI

In another run where 100 grams of isoprene (no pentenes present) was treated with 3.3 millimoles of allylsodium in the presence of 3.3 millimoles of fluorene at 32° C. for 24 hours, a small amount of the hexane insoluble 3,4 polyisoprene was formed which gave a crystalline X-ray pattern.

EXAMPLE XII

Treating 100 grams of isoprene G, as used in Example XI, with 16 millimoles of the disodium adduct of anthracene in the presence of 5.9 millimoles of fluorene yielded a small amount of the hexane insoluble powder in 4 hours at 30° C. which was isolated from a very large amount of hexane soluble polymer.

EXAMPLE XIII

In a preparation for the purification of isoprene 750 ml. of isoprene [1] was refluxed with 1.4 g. sodium metal.[2] After 2 hours some slimy polymer could be reached with a spatula at bottom of the flask. The viscosity of the liquid generally was not much different from isoprene without polymer. The isoprene was distilled down to 200 ml. which was left in the still pot with the sodium over the weekend when the sodium was deactivated with methanol and isopropanol and the insoluble polymer isolated by decanting off the isoprene and washing with hexane. It was then taken up in carbon disulfide and submitted for infrared analysis. The infrared spectrum showed only 3,4 addition in any significant amounts. No 1,4 structure could be detected.

The polymer was then submitted for X-ray analysis. It gave a very well defined crystalline isotactic 3,4-polyisoprene X-ray pattern.

[1] Containing about 2% trans pentene-2 and only traces of other impurities. No attempt made to dry isoprene.
[2] Added as a sodium dispersion of about 25 microns.

I claim:

1. The process of producing a highly crystalline, non-rubbery homopolymer from 1,3-butadiene monomer containing 0.15% by weight or less of 1,2-butadiene by the steps of:
   agitating the monomer at a temperature of from 0° to about 150° C. in contact with metallic sodium having a particle diameter of about 25 microns or less and fluorene, the sodium and fluorene being present in the amounts of from 0.008 to 0.0373 gram atom and from 0.0088 to 0.0188 mole, respectively, per 100 grams of monomer, and
   separating and recovering by solvent extraction the highly crystalline, non-rubbery homopolymer from the polymerizate thus formed.

2. The process of claim 1, wherein the monomer, metallic sodium and fluorene are agitated in the presence of an aliphatic or cycloaliphatic hydrocarbon diluent of from 4 to 10 carbon atoms.

3. The process of producing a highly crystalline, non-rubbery homopolymer from isoprene by the steps of:
   agitating the isoprene at a temperature of from 0° C. to about 150° C. in contact with a catalyst of metallic sodium having a particle diameter of about 25 microns or less and in the presence of a modifier selected from the group consisting of fluorene, trans-pentene-2, methyl ethyl ketone, and methyl vinyl ketone, the metallic sodium and modifier being present in the amounts of from 0.00275 to 0.012 gram atom and from 0.00072 to 0.056 mole, respectively, per 100 grams of isoprene, and
   separating and recovering by solvent extraction the highly crystalline, non-rubbery homopolymer from the polymerizate thus formed.

4. The process of producing a highly crystalline, non-rubbery homopolymer from isoprene by the steps of:
   agitating the isoprene at a temperature of from 0° C. to about 150° C. in contact with fluorene and a catalyst selected from the group consisting of phenylsodium, butylsodium, allylsodium and the disodium adduct of anthracene, the catalyst and fluorene being present in an amount of from 0.0032 to 0.016 mole and from 0.00193 to 0.0059 mole, respectively, per 100 grams isoprene, and
   separating and recovering by solvent extraction the highly crystalline, non-rubbery homopolymer from the polymerizate thus formed.

5. Crystalline isotactic 3,4-polyisoprene having a melting point between about 130° C. and about 200° C., and having, when oriented, an identity period of about 6.35 angstroms as measured on an X-ray pattern.

References Cited

UNITED STATES PATENTS

| 3,222,346 | 12/1965 | Appell | 260—94.2 |
| 3,284,430 | 11/1966 | Forman et al. | 260—94.2 |
| 3,331,826 | 7/1967 | Talcott | 260—94.2 |
| 3,137,683 | 6/1964 | Natta et al. | 260—94.2 |

FOREIGN PATENTS 1,430,643  1/1966  France.

OTHER REFERENCES

From Stereospecific Polymerization to Asymmetric Autocatalytic Synthesis of Macromolecules, vol. 38, No. 1, Rubber Chemistry & Technology, March 1965, pages L–LIII.

JOSEPH L. SCHOFER, Primary Examiner

W. F. HAMROCK, Assistant Examiner

U.S. Cl. X.R.

252—476; 260—95

UNITED STATES PATENT OFFICE
CERTIFICATE OF CORRECTION

Patent No. 3,536,690      Dated October 27, 1970

Inventor(s) Thomas Baldwin Talcott

It is certified that error appears in the above-identified patent and that said Letters Patent are hereby corrected as shown below:

In the Specification:

Column 3, line 12, change "∼C=Na" to -- ∼C Na --.

Column 4, line 59, change "hentanes" to --heptanes--.

Column 5, line 54, change "mircons" to --microns--.

Column 8, line 2, change "mm." to --mM--.

Column 8, line 38, add --by-- after addition.

Column 8, line 39, change "-ray" to --X-ray--.

Column 9, line 34, change "birfringent" to --birefringent

SIGNED AND
SEALED
DEC 29 1970

(SEAL)
Attest:

Edward M. Fletcher, Jr.
Attesting Officer

WILLIAM E. SCHUYLER, JR.
Commissioner of Patents